UNITED STATES PATENT OFFICE.

JOSEPH KALLMES, OF SAN FRANCISCO, CALIFORNIA.

IMPROVEMENT IN TREATING GOLD AND SILVER ORES.

Specification forming part of Letters Patent No. 138,500, dated May 6, 1873; application filed March 13, 1873.

*To all whom it may concern:*

Be it known that I, JOSEPH KALLMES, of San Francisco city and county, State of California, have invented Improvements in Treating Ores; and I do hereby declare the following description and accompanying drawing are sufficient to enable any person skilled in the art or science to which it most nearly appertains to make and use my said invention or improvement without further invention or experiment.

My invention relates to a novel process for treating gold and silver ores for the purpose of desulphurizing and chloridizing them previous to amalgamation without previous roasting. My process consists in placing the previously-pulverized ore in a vessel and moistening it with water, in order to render the chlorination of the mass more active. I then inject into the mass chlorine gas or an aqueous solution of chlorine, until the entire quantity of ore has been thoroughly saturated. Dry steam or hot air is then introduced into the mass in order to expel the excess of chlorine, thus leaving the metals in the form of chlorides, and free from sulphur.

In order to decompose the chlorides thus formed, I introduce metallic iron into the pulp and allow it to remain until the decomposition has been accomplished, thus leaving the metals in a suitable condition to be readily amalgamated. Quicksilver is then added in finely divided particles for the final amalgamation of the precious metals.

By this process I am able to extract a higher percentage of the precious metals than has heretofore been obtained by raw amalgamation. The amalgamation in this manner can also be performed in less time and with less labor and wear and tear of machinery than heretofore, and at a great saving of chemicals.

I am aware that heretofore the precious metals have been separated from their ores by roasting, grinding, and injection of chlorine, as described in English Patent to Cobley and Wright, No. 1,005, of 1862; but

Having thus described my invention, what I claim as new, and desire to secure by Letters Patent, is—

The process, substantially as herein described, for desulphurizing and chloridizing gold and silver by injecting, first, chlorine gas into the pulp, then dry steam or hot air, without roasting the ore, substantially as set forth.

In witness whereof I hereunto set my hand and seal.

JOSEPH KALLMES. [L. S.]

Witnesses:
  JOHN L. BOONE,
  C. M. RICHARDSON.